United States Patent
Cardin et al.

(10) Patent No.: US 9,608,415 B2
(45) Date of Patent: Mar. 28, 2017

(54) ELECTRICAL CABINET WITH VENTED EXHAUST

(71) Applicant: Thomas & Betts International LLC, Wilmington, DE (US)

(72) Inventors: Daniel Cardin, Ste-Julie (CA); Yves Boucher, St-Jean-sir Richelieu (CA); Jean-Marc Theoret, Magog (CA); Bud Thompson, Alexandria (CA); Yves Duchesne, Laval (CA); Ferenc Kungl, Kungl (CA); Daniel Lalancette, St-Jean-sur-Richelieu (CA)

(73) Assignee: Thomas & Betts International LLC, Wilmington, DE (US)

( * ) Notice: Subject to any disclaimer, the term of this patent is extended or adjusted under 35 U.S.C. 154(b) by 68 days.

(21) Appl. No.: 14/801,061

(22) Filed: Jul. 16, 2015

(65) Prior Publication Data

US 2016/0028217 A1    Jan. 28, 2016

Related U.S. Application Data

(60) Provisional application No. 62/029,285, filed on Jul. 25, 2014.

(51) Int. Cl.
  *H02B 1/56* (2006.01)
  *H02B 13/025* (2006.01)
  *H02B 1/30* (2006.01)
(52) U.S. Cl.
  CPC ............. *H02B 13/025* (2013.01); *H02B 1/30* (2013.01); *H02B 1/303* (2013.01)
(58) Field of Classification Search
  CPC ...... H02B 13/025; H02B 1/565; H02B 13/00; H02B 1/56; H02B 1/26; H02B 1/30; H02B 1/303; H01H 33/53; H05K 5/00; H05K 5/02; H05K 5/0213; H05K 5/0217; H05K 7/00; H05K 7/20; H05K 7/20181
  USPC ......... 174/50, 17 VA, 17 R, 521, 15.1, 16.1, 174/520; 361/600, 601, 676, 677, 678, 361/679.01, 688, 690, 724; 211/26
  See application file for complete search history.

(56) References Cited

U.S. PATENT DOCUMENTS

| | | | |
|---|---|---|---|
| 4,528,614 A | 7/1985 | Shariff et al. | |
| 4,769,739 A | 9/1988 | De Bruin | |
| 5,193,049 A | 3/1993 | Jackson | |
| 5,201,879 A * | 4/1993 | Steele | F24F 13/08 174/16.1 |
| 5,372,543 A * | 12/1994 | Steele | F24F 13/08 174/16.1 |
| 5,574,624 A | 11/1996 | Rennie et al. | |
| 5,689,097 A | 11/1997 | Aufermann et al. | |
| 5,697,840 A * | 12/1997 | Bainbridge | H05K 7/20172 361/693 |
| 5,710,402 A | 1/1998 | Karnbach et al. | |
| 5,744,213 A * | 4/1998 | Nelson | H05K 7/20172 361/693 |
| 5,892,195 A | 4/1999 | Aufermann et al. | |

(Continued)

*Primary Examiner* — Angel R Estrada
(74) *Attorney, Agent, or Firm* — Hoffmann & Baron, LLP

(57) ABSTRACT

A vented exhaust system for an electrical cabinet housing high voltage equipment. Very short-time explosions can occur within the electrical cabinet that are the result of a short circuit of the equipment housed within. The vented exhaust system provides for a way to safely release the pressure and hot gasses that can result from the short circuit so that the cabinet does not explode.

20 Claims, 6 Drawing Sheets

(56) References Cited

U.S. PATENT DOCUMENTS

| | | |
|---|---|---|
| 6,407,331 B1 | 6/2002 | Smith et al. |
| 6,512,192 B1 | 1/2003 | Yee et al. |
| 6,646,867 B1 * | 11/2003 | Tuttle ................ H05K 5/0213 |
| | | 174/16.1 |
| 6,762,389 B1 | 7/2004 | Crooks et al. |
| 6,924,721 B2 | 8/2005 | Afshari et al. |
| 6,977,354 B1 | 12/2005 | Shea et al. |
| 7,031,154 B2 * | 4/2006 | Bash ................ H05K 7/20736 |
| | | 211/26 |
| 7,236,352 B2 | 6/2007 | Dalis |
| 7,391,597 B2 | 6/2008 | Meeks et al. |
| 7,586,057 B2 | 9/2009 | Sisson et al. |
| 7,778,013 B2 | 8/2010 | Bruski et al. |
| 7,952,857 B1 | 5/2011 | Motley et al. |
| 7,974,078 B2 | 7/2011 | Coomer et al. |
| 8,101,881 B2 | 1/2012 | Miller et al. |
| 8,242,395 B2 | 8/2012 | Josten et al. |
| 8,598,484 B2 | 12/2013 | Engel et al. |
| 8,648,274 B2 | 2/2014 | Carlson et al. |
| 8,901,417 B2 * | 12/2014 | Herring ................ H05K 5/0217 |
| | | 174/50 |
| 2004/0114289 A1 | 6/2004 | Eiselt et al. |
| 2005/0186899 A1 | 8/2005 | Palmer et al. |
| 2006/0152889 A1 | 7/2006 | Dalis |
| 2009/0212022 A1 | 8/2009 | Josten et al. |

\* cited by examiner

ELECTRICAL CABINET WITH VENTED EXHAUST

CROSS REFERENCE TO RELATED APPLICATIONS

This application claims priority to U.S. Provisional Patent Application No. 62/029,285, filed on Jul. 25, 2014, the contents of which is incorporated herein by reference in its entirety.

FIELD OF THE INVENTION

In general, the present invention relates to a vented exhaust system for an electrical cabinet, such as a cabinet that houses high voltage electrical equipment used in public electricity distribution.

BACKGROUND OF THE INVENTION

Electrical cabinets that house high voltage electrical equipment, such as switchgear, that are used for public electricity distribution must have the ability to vent, exhaust or otherwise controllably release pressure and hot gases that can occur inside the cabinet in case of a very short-time explosion which can be the result of a short circuit of the equipment that is housed within. Some solutions already exist, but a less expensive and safer alternative is desired.

SUMMARY OF THE INVENTION

The present invention provides a triple-wall vented exhaust system for an electrical cabinet, such as a cabinet that houses high voltage electrical equipment used in public electricity distribution. An inner plate is located within the cabinet that houses the high voltage electrical equipment and comprises the first wall. The middle wall of the triple-wall vented exhaust system is comprised of louvers which are located within the wall of the cabinet panel housing. The third wall is a deflector plate that is located outside of the wall of the cabinet panel housing. The combination of the inner plate, the louvers and the outer deflector plate comprise the triple-wall vented exhaust system.

DETAILED DESCRIPTION OF THE PREFERRED EMBODIMENTS

Figure 1:
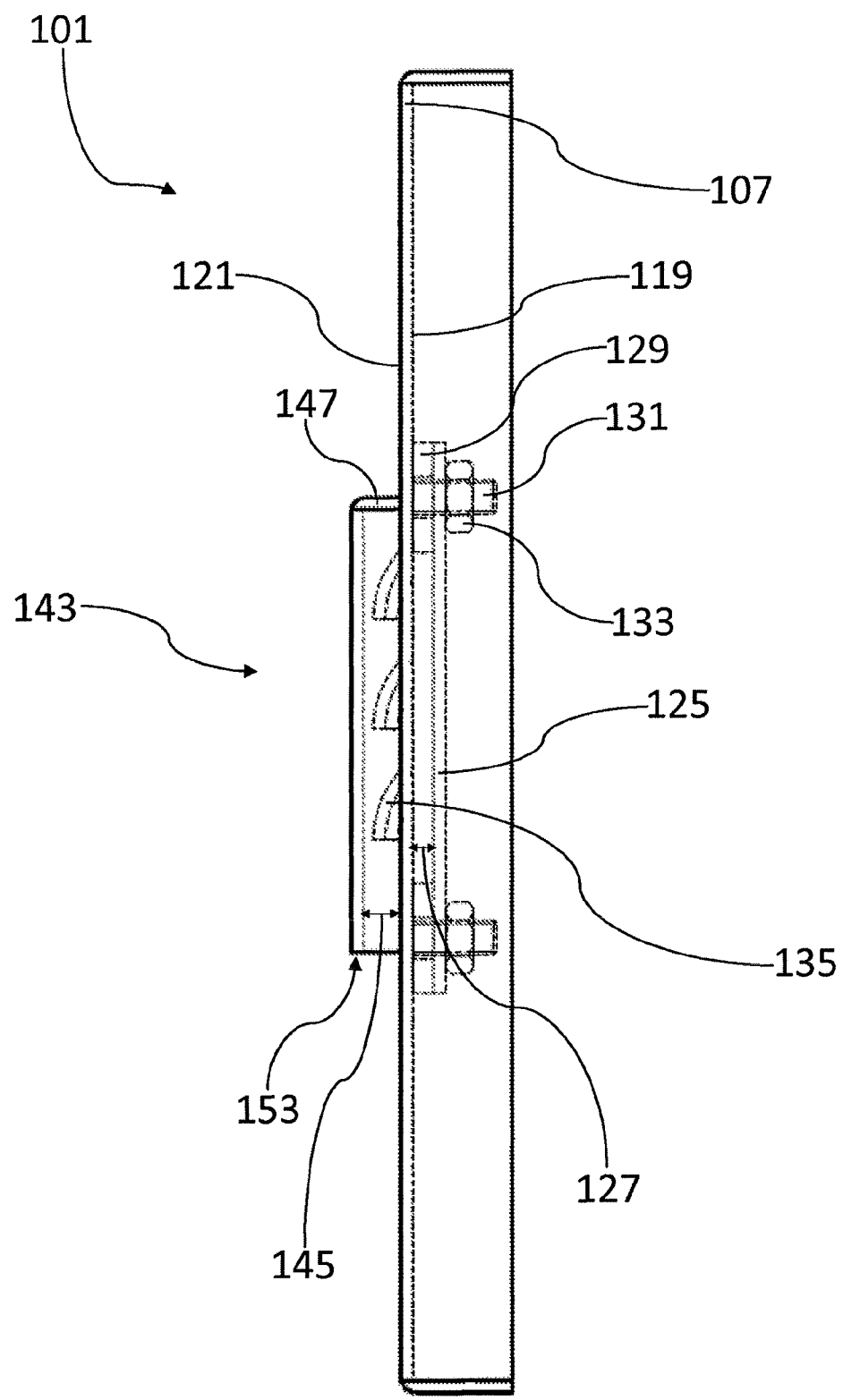
FIG. 1 is a side elevation cross-sectional view of the triple-wall vented exhaust system for an electrical cabinet of the present invention.

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 4:
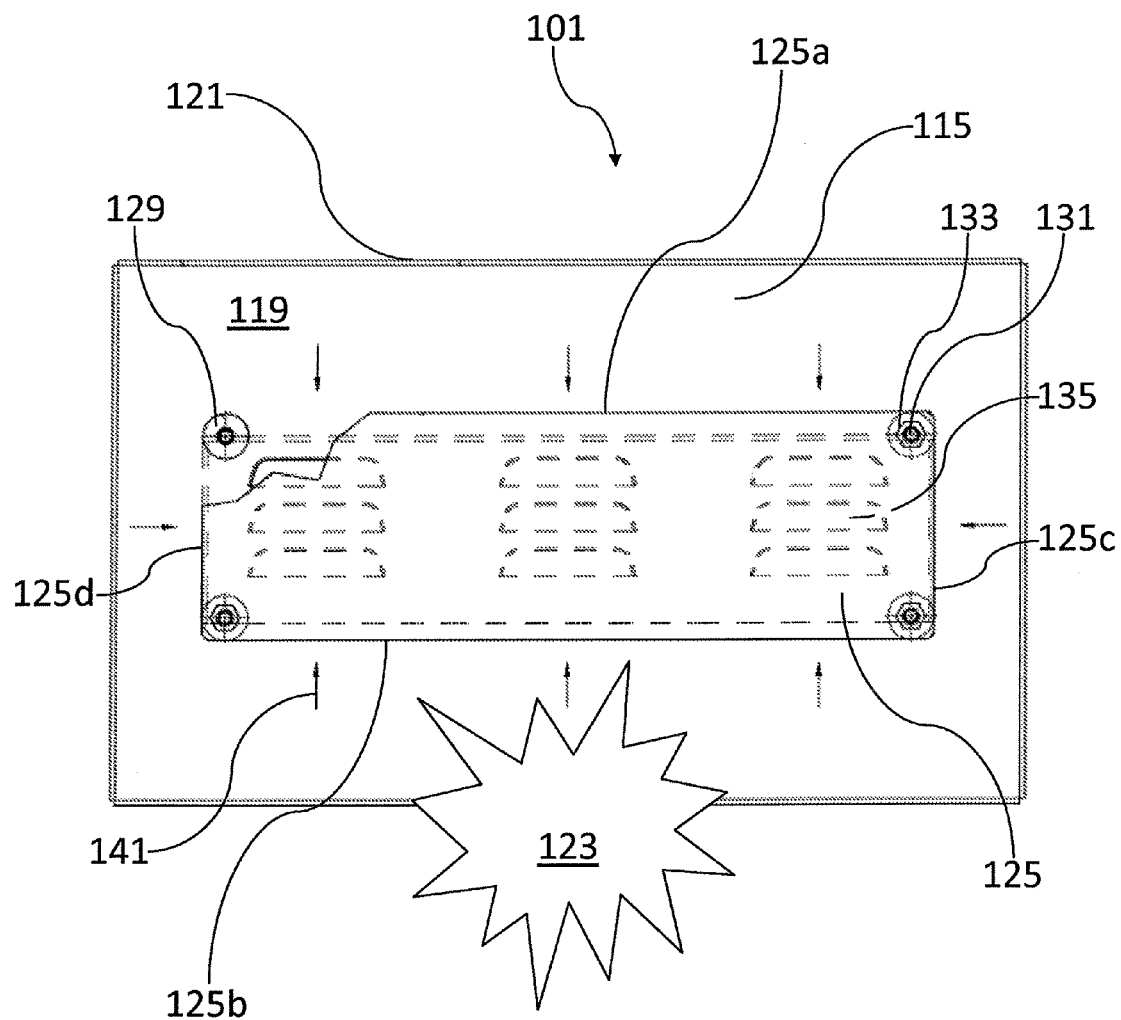
FIG. 4 is a rear elevation view of the triple-wall vented exhaust system for an electrical cabinet of the present invention showing air flow through the system.
Figure 6:
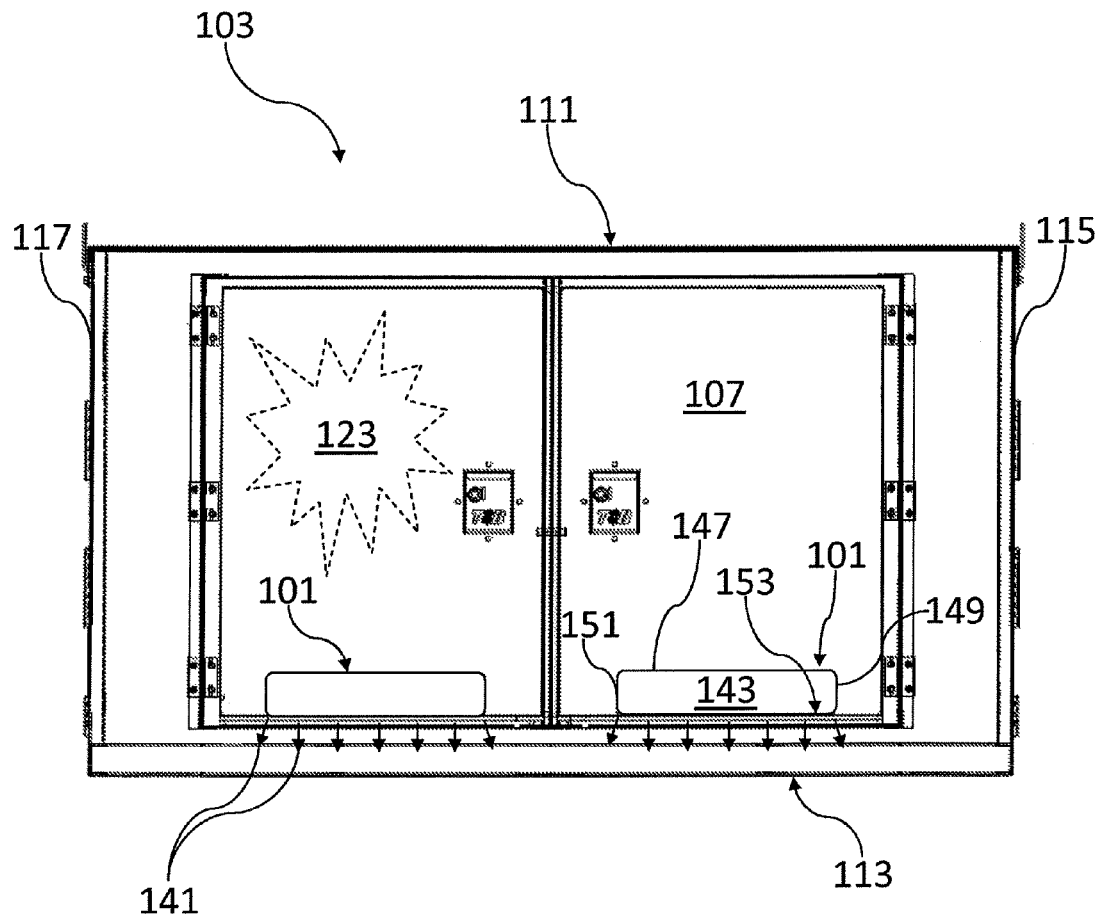
FIG. 6 is a front elevation view an electrical cabinet with a triple-wall vented exhaust system of the present invention showing air flow through the system.

Shown in FIG. 1 is a side elevation cross-sectional view of a triple-wall vented exhaust system 101 for an electrical cabinet of the present invention. The vented exhaust system 101 includes an inner plate 125, a plurality of louvers 135 and an outer plate 143. The vented exhaust system 101 may be located in one or many locations on an electrical cabinet 103, such as shown in FIG. 6. In FIG. 6, the vented exhaust system 101 is shown to be located on a front wall 107 of the electrical cabinet 103, but it may be located on a top wall 111, a side wall 115 or 117, a bottom wall 113, or a rear wall 109 (not shown). The inner plate 125 of the vented exhaust system 101 is attached to an inner surface 119 of the cabinet wall 107 and is spaced a first distance 127 from the inner surface 119 of the cabinet wall 107 with spacers 129. Because of the spacers 129 which allow the inner plate 125 to be spaced a first distance 127 from the inner surface 119 of the cabinet wall 107, the inner plate is open on all four sides to the space within the cabinet. In FIG. 4, four spacers 129 are shown to be used, one at each corner of the inner plate 125, to space the inner plate 125 the first distance 127 from the inner surface 119 of the cabinet wall 107. However, it is understood that more or fewer spacers 129 may be used. The inner plate 125 is attached to the inner surface 119 of the cabinet wall 107 by means of threaded weld studs 131 and nuts 133, also shown in FIG. 1. Similarly to the spacers 129, there are four sets of threaded weld studs 131 and nuts 133 shown to attach the inner plate 125 to the inner surface 119 of the cabinet wall 107, one set at each corner of the inner plate 125. However, it is understood that more or fewer sets of threaded weld studs 131 and nuts 133 may be used. The inner plate 125 comprises the first wall of the triple wall vented exhaust system 101.

Figure 2:
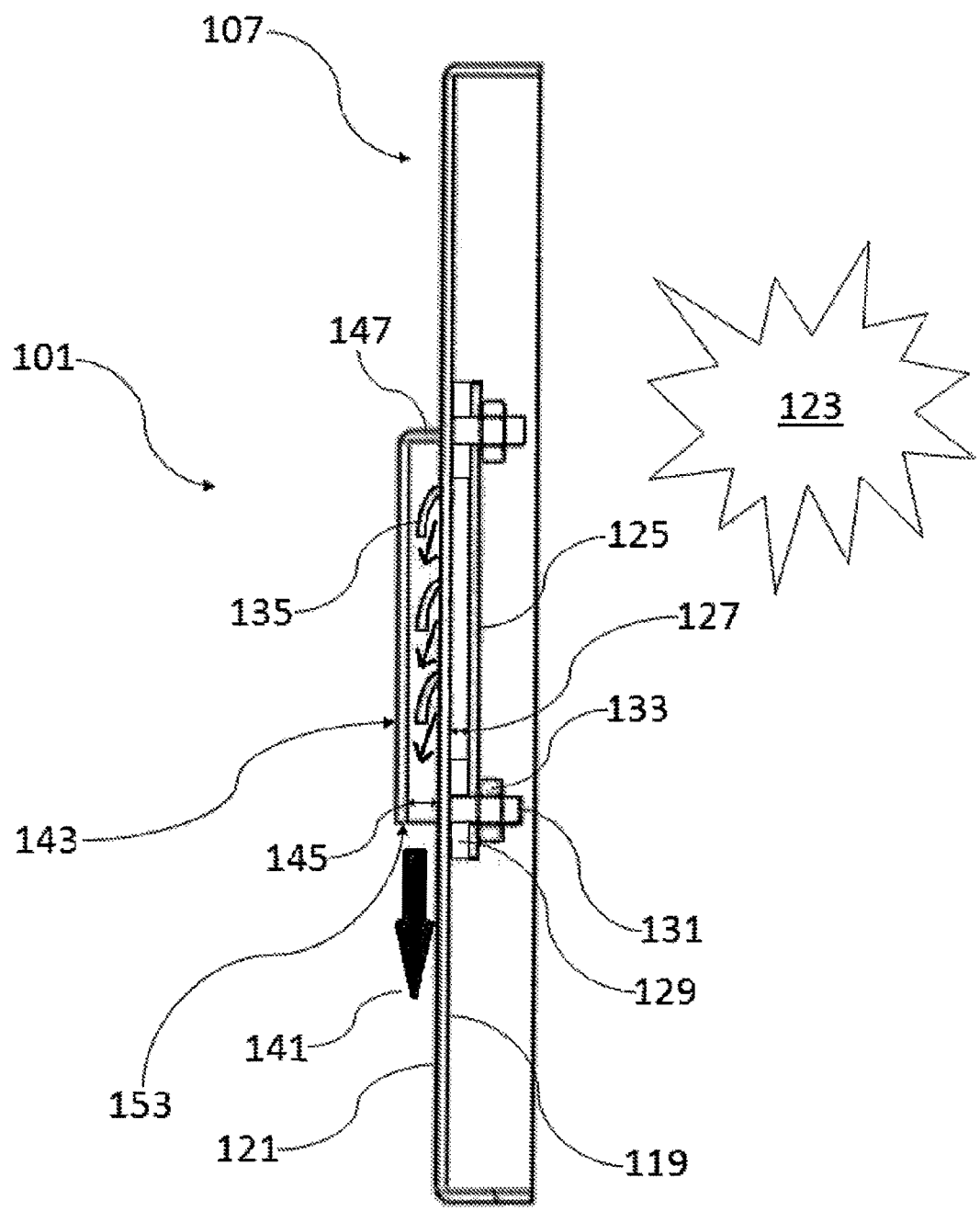
FIG. 2 is a side elevation cross-sectional view of the triple-wall vented exhaust system for an electrical cabinet of the present invention showing air flow through the system.

The second and middle wall of the triple wall vented exhaust system 101 is includes a plurality of louvers 135 which are integrally contained within the wall 107 of the cabinet and are positioned immediately adjacent and parallel to the inner plate 125. The louvers 135 are positioned such that they direct any airflow exiting the louvers 135 in a downward position. This airflow 141 exiting the louvers 135 is shown in FIG. 2. The airflow 141 is caused by a very short-time (less than 1 second) short circuit explosion 123 which can sometimes occur in electrical cabinets which house high-voltage electrical equipment. When the short circuit 123 occurs, the resulting pressure and hot gases released from the short circuit explosion 123 are able to escape around the inner plate 125, previously described, which is open on all four sides and then directed through the plurality of louvers 135 in a downward direction.

In FIGS. 1 and 2 the louvers 135 which are integrally contained within the wall 107 of the cabinet are shown to be fixed, and remain open between the inside and outside of the cabinet at all times. However, it is understood that the louvers 135 could serve the same purpose as previously described if they were movable about a horizontal axis such that they would be allowed to move in an outward direction away from the cabinet interior from a closed position into an open position when sufficient airflow 141, caused by a short circuit explosion 123 within the cabinet, contacts the louvers 135 from within the cabinet. Then, when the airflow 141 ceased due to the complete release of pressure and gases from the short circuit explosion 123, the louvers 135 would return to a closed position by rotating about a horizontal axis until they came to rest at a position parallel to the cabinet wall 107.

The third and last wall of the triple wall vented exhaust system 101, also shown in FIGS. 1 and 2, includes an outer plate 143. The outer plate 143 is welded to an outer surface 121 of the cabinet wall 107 and is positioned immediately adjacent and parallel to the louvers 135. The outer plate 143 serves as the last "layer" of the triple wall vented exhaust system to direct pressure and gases out of the electrical cabinet. The outer plate 143 is welded on a top edge 147, and side edges 149 and 151, shown in FIGS. 3, 5 and 6, to the outer surface 121 of the cabinet wall 107. This leaves a bottom edge 153 of the outer plate 143 open to the outside environment and allows the airflow 141 which is directed out of the louvers 135 to exit from the bottom edge 153 of the outer plate 143, again directing the airflow 141 in a downward direction. Similarly to the inner plate 125, the outer plate 143 is spaced a second distance 145 from the outer surface 121 of the wall 107.

Figure 3:
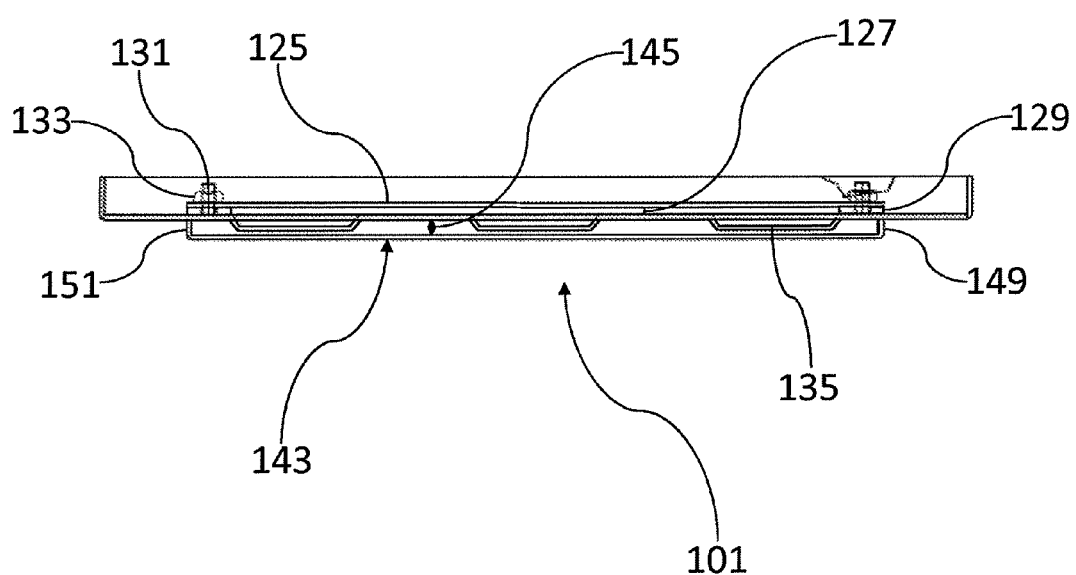
FIG. 3 is a plan view of the triple-wall vented exhaust system for an electrical cabinet of the present invention.

FIG. 3 shows a plan view of the previously discussed vented exhaust system 101 of the present invention. Again, the inner plate 125, plurality of louvers 135 and outer plate 143 are shown. FIG. 4 shows a rear elevation view of the triple-wall vented exhaust system 101 for an electrical cabinet of the present invention with air flow 141 through the system. This rear elevation view is a look from within the electrical cabinet 103, such as shown in FIG. 6. In FIG. 4, it can be seen that when a short circuit explosion 123 takes place within the cabinet due to a short circuit of the high-voltage electrical equipment housed within, the resulting air flow 141 that occurs due to the pressure and hot gases released from the explosion can escape around the open edges 125a, 125b, 125c and 125d of the inner plate 125. The air flow 141 is able to escape around the open edges of the inner plate 125 due to the first distance 127, shown in FIGS. 1-3, that the inner plate 125 is spaced from the wall inner surface 119 of the cabinet.

Figure 5:
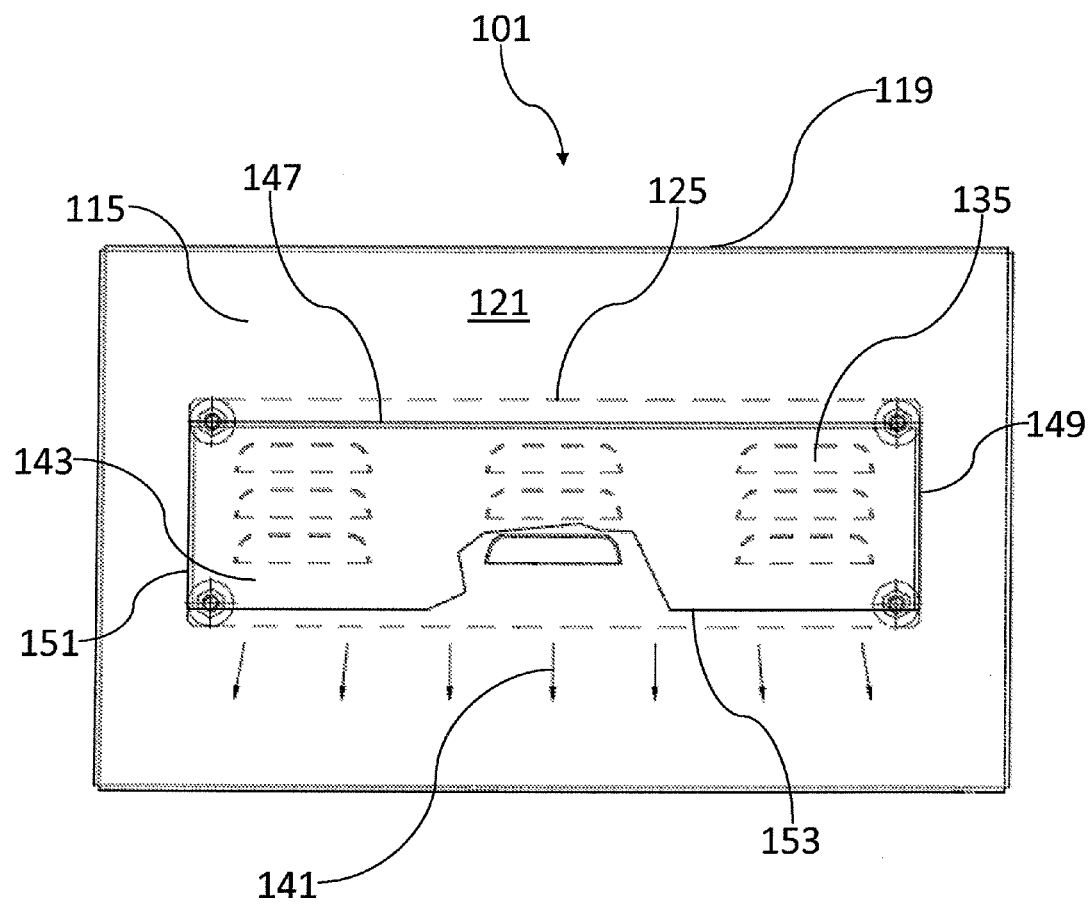
FIG. 5 is a front elevation view of the triple-wall vented exhaust system for an electrical cabinet of the present invention showing air flow through the system.

FIG. 5 shows a front elevation view of the triple-wall vented exhaust system 101 for an electrical cabinet of the present invention, again with air flow 141 through the system. This front elevation view is a look from outside of the electrical cabinet 103, such as shown in FIG. 6. In FIG. 5, it can be seen that the airflow 141, as mentioned above, is exiting the electrical cabinet from the bottom edge 153 of the outer plate 143. The top edge 147 and two side edges 149 and 151 of the outer plate 143 are welded to the wall outer surface 121 of the side wall 115 of the electrical cabinet, leaving only the bottom edge 153 open to the outside environment, and thus allowing the airflow 141 to exit in one direction. The air flow 141 is able to escape from the open bottom edge 153 of the outer plate 143 due to the second distance 145, shown in FIGS. 1-3, that the outer plate 143 is spaced from the wall outer surface 121 of the cabinet. The inner plate 125 and the louvers 135, which are located adjacent, parallel to and behind the outer plate 143 are also shown again in FIG. 5 in broken lines to represent their location behind the cabinet side wall 115.

Finally, shown in FIG. 6 is an overall view of the electrical cabinet 103 with the vented exhaust system 101. In FIG. 6, it is shown that the electrical cabinet 103 has the vented exhaust system 101 at two locations on the front wall 107 of the electrical cabinet 103. However, it is understood that the electrical cabinet 103 may have the vented exhaust system 101 located at more or fewer locations on different walls of the electrical cabinet, such as the side walls 115 and 117, top wall 111, rear wall 109 (not shown) or bottom wall 113 if the cabinet 103 is elevated from the ground. The vented exhaust system 101 may be on multiple walls and at multiple locations, on a single wall with multiple locations, on multiple walls at a single location or on a single wall at a single location. As previously explained, the high voltage equipment (not shown) that is housed within the cabinet 103 may experience a short circuit which can cause the short circuit explosion 123. The airflow 141 caused by the pressure and hot gases of the explosion ultimately exits the cabinet 103 through the bottom edge 153 of the outer plate 143, creating a safe path to release the pressure and hot gases which result from the short circuit explosion 123.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A vented exhaust system for an electrical cabinet housing high voltage equipment comprising:
   an electrical cabinet which is comprised of a front wall, a rear wall, a top wall, a bottom wall and two opposing side walls;
   wherein each of the front wall, rear wall, top wall, bottom wall and two opposing side walls comprise an inner surface and an outer surface;
   an inner plate which is fixedly attached to the inner surface of at least one wall of the electrical cabinet such that it is spaced a first distance from the inner surface of the at least one wall;
   a plurality of louvers which protrude from the at least one wall of the electrical cabinet and are positioned immediately adjacent to the inner plate; and
   an outer plate which is fixedly attached to the outer surface of the at least one wall of the electrical cabinet such that it is spaced a second distance from the outer surface of the at least one wall of the electrical cabinet, immediately adjacent and parallel to the plurality of louvers which are integrally contained within the at least one wall of the electrical cabinet.

2. The vented exhaust system for an electrical cabinet of claim 1, wherein the inner plate is spaced a first distance from the inner surface of the at least one wall by spacers that are located on at least two locations of the plate.

3. The vented exhaust system for an electrical cabinet of claim 1, wherein the inner plate is fixedly attached to the inner surface of the at least one wall of the electrical cabinet with threaded weld studs and nuts.

4. The vented exhaust system for an electrical cabinet of claim 1, wherein the inner plate is open on all four sides of the plate to allow air flow on all four sides of the plate.

5. The vented exhaust system for an electrical cabinet of claim 1, wherein the louvers are positioned such that they direct any airflow exiting the louvers in a downward direction.

6. The vented exhaust system for an electrical cabinet of claim 1, wherein the louvers are fixedly contained within the at least one wall of the electrical cabinet about a horizontal axis such that they do not move.

7. The vented exhaust system for an electrical cabinet of claim 1, wherein the louvers are movably contained within the at least one wall of the electrical cabinet about a horizontal axis such that they move in an outward direction into an open position from a closed position when sufficient airflow contacts the louvers from within the cabinet.

8. The vented exhaust system for an electrical cabinet of claim 1, wherein the outer plate which is fixedly attached to the outer surface of the at least one wall of the electrical cabinet is welded to the at least one wall of the electrical cabinet along a top edge of the outer plate and two side edges of the outer plate such that the outer plate is closed on three sides and open on a bottom edge to allow airflow to exit the bottom edge.

9. The vented exhaust system for an electrical cabinet of claim 1, wherein the inner plate, plurality of louvers and outer plate combination are positioned at multiple locations on at least one wall of the electrical cabinet.

10. A vented exhaust system for an electrical cabinet housing high voltage equipment comprising:
  an electrical cabinet which is comprised of a front wall, a rear wall, a top wall, a bottom wall and two opposing side walls;
  wherein each of the front wall, rear wall, top wall, bottom wall and two opposing side walls comprise an inner surface and an outer surface;
  an inner plate which is fixedly attached to the inner surface of at least one wall of the electrical cabinet such that it is spaced a first distance from the inner surface of the at least one wall;
  a plurality of louvers which protrude from the at least one wall of the electrical cabinet and are positioned immediately adjacent to the inner plate;
  an outer plate which is fixedly attached to the outer surface of the at least one wall of the electrical cabinet such that it is spaced a second distance from the outer surface of the at least one wall of the electrical cabinet, immediately adjacent and parallel to the plurality of louvers which are integrally contained within the at least one wall of the electrical cabinet; and
  wherein the inner plate, plurality of louvers and outer plate combination are positioned at multiple locations on at least one wall of the electrical cabinet.

11. The vented exhaust system for an electrical cabinet of claim 10, wherein the inner plate is spaced a first distance from the inner surface of the at least one wall by spacers that are located on at least two locations of the plate.

12. The vented exhaust system for an electrical cabinet of claim 10, wherein the inner plate is fixedly attached to the inner surface of the at least one wall of the electrical cabinet with threaded weld studs and nuts.

13. The vented exhaust system for an electrical cabinet of claim 10, wherein the inner plate is open on all four sides of the plate to allow air flow on all four sides of the plate.

14. The vented exhaust system for an electrical cabinet of claim 10, wherein the louvers are positioned such that they direct any airflow exiting the louvers in a downward direction.

15. The vented exhaust system for an electrical cabinet of claim 10, wherein the louvers are fixedly contained within the at least one wall of the electrical cabinet about a horizontal axis such that they do not move.

16. The vented exhaust system for an electrical cabinet of claim 10, wherein the louvers are movably contained within the at least one wall of the electrical cabinet about a horizontal axis such that they move in an outward direction into an open position from a closed position when sufficient airflow contacts the louvers from within the cabinet.

17. The vented exhaust system for an electrical cabinet of claim 10, wherein the outer plate which is fixedly attached to the outer surface of the at least one wall of the electrical cabinet is welded to the at least one wall of the electrical cabinet along a top edge of the outer plate and two side edges of the outer plate such that the outer plate is closed on three sides and open on a bottom edge to allow airflow to exit the bottom edge.

18. A vented exhaust system for an electrical cabinet housing high voltage equipment comprising:
  an electrical cabinet which is comprised of a front wall, a rear wall, a top wall, a bottom wall and two opposing side walls;
  wherein each of the front wall, rear wall, top wall, bottom wall and two opposing side walls comprise an inner surface and an outer surface;
  an inner plate which is fixedly attached to the inner surface of at least one wall of the electrical cabinet with threaded weld studs and nuts such that it is spaced a first distance from the inner surface of the at least one wall with spacers and open on all four sides of the plate to allow air flow on all four sides of the plate;
  a plurality of louvers which protrude from the at least one wall of the electrical cabinet and are positioned immediately adjacent to the inner plate and positioned such that they direct any airflow exiting the louvers in a downward direction;
  an outer plate which is welded to the outer surface of the at least one wall of the electrical cabinet along a top edge of the outer plate and two side edges of the outer plate such that the outer plate is closed on three sides and open on a bottom edge and such that it is spaced a second distance from the outer surface of the at least one wall of the electrical cabinet, immediately adjacent and parallel to the plurality of louvers which are integrally contained within the at least one wall of the electrical cabinet; and
  wherein the inner plate, plurality of louvers and outer plate combination are positioned at multiple locations on at least one wall of the electrical cabinet.

19. The vented exhaust system for an electrical cabinet of claim 18, wherein the louvers are fixedly contained within the at least one wall of the electrical cabinet about a horizontal axis such that they do not move.

20. The vented exhaust system for an electrical cabinet of claim 18, wherein the louvers are movably contained within the at least one wall of the electrical cabinet about a horizontal axis such that they move in an outward direction into an open position from a closed position when sufficient airflow contacts the louvers from within the cabinet.

* * * * *